(12) United States Patent
Sinha et al.

(10) Patent No.: US 11,023,819 B2
(45) Date of Patent: Jun. 1, 2021

(54) MACHINE-LEARNING MODELS APPLIED TO INTERACTION DATA FOR FACILITATING EXPERIENCE-BASED MODIFICATIONS TO INTERFACE ELEMENTS IN ONLINE ENVIRONMENTS

(71) Applicant: Adobe Inc., San Jose, GA (US)

(72) Inventors: Atanu R. Sinha, Bangalore (IN); Deepali Jain, Karnataka (IN); Nikhil Sheoran, Chandigarh (IN); Deepali Gupta, New Delhi (IN); Sopan Khosla, Karnataka (IN)

(73) Assignee: ADOBE INC., San Jose, CA (US)

( * ) Notice: Subject to any disclaimer, the term of this patent is extended or adjusted under 35 U.S.C. 154(b) by 307 days.

(21) Appl. No.: 15/946,884

(22) Filed: Apr. 6, 2018

(65) Prior Publication Data
US 2019/0311279 A1    Oct. 10, 2019

(51) Int. Cl.
| G06N 7/00 | (2006.01) |
| G06N 20/00 | (2019.01) |
| G06K 9/62 | (2006.01) |
| G06F 17/11 | (2006.01) |

(52) U.S. Cl.
CPC .............. G06N 7/005 (2013.01); G06F 17/11 (2013.01); G06K 9/6218 (2013.01); G06K 9/6257 (2013.01); G06N 20/00 (2019.01)

(58) Field of Classification Search
CPC .. G06K 9/6273; G06K 9/6257; G06K 9/6218; G06F 17/11; G06N 3/0445; G06N 3/08; G06N 7/005; G06N 20/00
USPC ........................................................ 702/186
See application file for complete search history.

(56) References Cited

PUBLICATIONS

Abbott, Lawrence, "Quality and Competition" An Essay in Economic Theory, New York, Columbia University Press, 1955, 5 pages.
McCarthy, John, et al., "Technology as Experience", Cambridge, MA; MIT Press, 2004, 224 pages.
Gentile, Chiara, "How to Sustain the Customer Experience: An Overview of Experience Components that Co-create Value With the Customer," European Management Journal vol. 25, No. 5, Oct. 2007, 5 pages.

(Continued)

*Primary Examiner* — Michael P Nghiem
*Assistant Examiner* — Dacthang P Ngo
(74) *Attorney, Agent, or Firm* — Kilpatrick Townsend & Stockton LLP

(57) ABSTRACT

In some embodiments, a computing system computes, with a state prediction model, probabilities of transitioning from a click state represented by interaction data to various predicted next states. The computing system computes an interface experience metric for the click with an experience valuation model. To do so, the computing system identifies base values for the click state and the predicted next states. The computing system computes value differentials for between the click state's base value and each predicted next state's base value. Value differentials indicate qualities of interface experience. The computing system determines the interface experience metric from a summation that includes the current click state's base value and the value differentials weighted with the predicted next states' probabilities. The computing system transmits the interface experience metric to an online platform, which can cause interface elements of the online platform to be modified based on the interface experience metric.

20 Claims, 7 Drawing Sheets

(56) References Cited

PUBLICATIONS

Lemon, Katherine, et al., "Understanding Customer Experience Throughout the Customer Journey," Journal of Marketing, Nov. 2016, V. 80, 28 pages.

Zikmund, William et al., "Exploring Marketing Research", South-Western College Publication; 10th edition, 2009, 2 pages.

Lang, Tobias, et al., "Understanding Consumer Behavior with Recurrent Neural Networks," mlrec.org/2017/papers/paper2.pdf, Int. Workshop on Machine Learning Methods for Recommender Systems, 2017, 8 pages.

Korpusik, Mandy, et al,"Recurrent Neural Networks for Customer Purchase Prediction on Twitter," CBRecSys@ RecSys, 2016, 4 pages.

Zhang, Yuyu, et al., "Sequential Click Prediction for Sponsored Search With Recurrent Neural Networks," Proceedings of the Twenty-Eighth AAAI Conference on Artificial Intelligence, 2014, 7 pages.

Moe, Wendy, et al., "Dynamic Conversion Behavior at E-Commerce Sites", Management Science. vol. 50, No. 3, Mar. 2004, 11 pages.

Anderson, Corin R., et al, "Relational Markov Models and Their Application to Adaptive Web Navigation," Proceedings of the eighth ACM SIGKDD international conference on Knowledge discovery and data mining, 143152, ACM, 2002, 10 pages.

Ypma, Alexander, et al., "Automatic Categorization of Web Pages and User Clustering With Mixtures of Hidden Markov Models", International Workshop on Mining Web Data for Discovering Usage Patterns and Profiles, 2002, 15 pages.

Balakrishnan, Girish, et al., "Predicting Student Retention in Massive Open Online Courses Using Hidden Markov Models." Electrical Engineering and Computer Sciences University of California at Berkeley, May 2013, 11 pages.

Yu, Huizhen, et al., 2017 "On Generalized Bellman Equations and Temporal-Difference Learning," Canadian Conference on Artificial Intelligence, May 2017, reprint arXiv:1704.04463, Apr. 2017, 35 pages.

Williamson, Oliver E., "Transaction Cost Economics", Ch. 3, Handbook of Industrial Economics, V. 1, 1989, 35 pages.

Chylinski, Matthew, et al., "Experience Infusion: How to Improve Customer Experience with Incidental Activities," Marketing Science Institute Working Paper Series 2017, Report No. 17-106, 2 pages.

Novak, Thomas P. et al., , "The Influence of Goal-Directed and Experiential Activities on Online Flow Experiences," Journal of Consumer Psychology, vol. 13, Issues 1-2, 2003, 15 pages.

Kivetz, Ran, et al., "The Goal-Gradient Hypothesis Resurrected: Purchase Acceleration, Illusionary Goal Progress, and Customer Retention," Journal of Marketing Research, V, XLIII, 2006, 21 pages.

Moe, Wendy W., "Buying, Searching, or Browsing: Differentiating Between Online Shoppers Using In-Store Navigational Clickstream," Journal of Consumer Psychology, vol. 13, Mar. 2003, 11 pages.

McKinsey & Company, "The CEO Guide to Customer Experience", https://www.mckinsey.com/business-functions/operations/our-insights/the-ceo-guide-to-customer-experience, Aug. 2016, 13 pages.

Mahoney, Amanda, "Priceless: Turning Ordinary Products into Extraordinary Experiences—Creating the priceless", https://hbswk.hbs.edu/archive/priceless-turning-ordinary-products-into-extraordinary-experiences-creating-the-priceless-product%20Product , Nov. 2002, 8 pages.

Customer Thermometer "Real-Time, Actionable Feedback From Any Email You Send", https://www.customerthermometer.com/, 2018, 11 pages.

ACSI, American Customer Satisfaction Index, "Municipal Utilities Post Large ACSI Gain in 2018", 2018, http://www.theacsi.org/ , 2 pages.

Hochreiter, Sepp, "Long Short-Term Memory", Neural Computation, 9(8):17351780, 1997 46 pages.

Diederik, Kingma, P., et al., "Adam: A Method for Stochastic Optimization", arXiv:1412.6980 [cs.LG], Dec. 2014, revised Jan. 2017, 15 pages.

Medallia, "Net Promoter Score", https://www.medallia.com/net-promoter-score/, 2018, 8 pages.

Checkmarket, "Customer Effort Score Survey", https://www.checkmarket.com/customer-effort-score/, 2018, 6 pages.

Hubspot, "What is Customer Satisfaction Score (CSAT)?", https://blog.hubspot.com/service/customer-satisfaction-score, Nov. 28, 2017, updated Apr. 11, 2018,, 9 pages.

Forrester Research, Inc., "CX Index", https://go.forrester.com/data/cx-index/, 2018, 6 pages.

Kim, Youngho, "Modeling Dwell Time to Predict Click-Level Satisfaction" In Proceedings of the 7th ACM International Conference on Web Search and Data Mining, WSDM '14, 2014, ACM, 10 pages.

Liu, Zhicheng Patterns and Sequences: Interactive Exploration of Clickstreams to Understand Common Visitor Paths, IEEE Transactions on Visualization and Computer Graphics, 23(1):321{330, Jan. 2017, 1.

Odijk, Daan, "Struggling and Success in Web Search", In Proceedings of the 24th ACM International on Conference on Information and Knowledge Management, ACM, 2015, 10 pages.

Wang, Hongning, et al., "Modeling Action-Level Satisfaction for Search Task Satisfaction Prediction", In Proceedings of the 37th international ACM SIGIR conference on Research & development in information retrieval, ACM, 2014, 10 pages.

Zhang, Xiang "Data-Driven Personas: Constructing Archetypal Users With Clickstreams and User Telemetry", In Proceedings of the 2016 CHI Conference on Human Factors in Computing Systems, CHI '16, ACM, May 2016, 10 pages.

MACHINE-LEARNING MODELS APPLIED TO INTERACTION DATA FOR FACILITATING EXPERIENCE-BASED MODIFICATIONS TO INTERFACE ELEMENTS IN ONLINE ENVIRONMENTS

TECHNICAL FIELD

This disclosure relates generally to machine-learning systems that facilitate modifying an interactive computing environment to enhance users' ability to interact with web-based applications and other electronic applications. More specifically, but not by way of limitation, this disclosure relates to applying machine-learning models to interaction data for evaluating and, in some cases, performing experience-based modifications to interfaces for interacting with online environments.

BACKGROUND

Interactive computing environments, such as web-based applications or other online software platforms, allow users to perform various computer-implemented functions through graphical interfaces. A given interactive environment includes different graphical interfaces, each of which has a particular arrangement of available functionality or other content, that correspond to different states within the user environment. For instance, the interactive computing environment could have a first state in which a user device is presented with interface elements that search databases for different content items, a second state in which the user device is presented with interface elements that select the content items by storing them in a temporary memory location, and a third state in which the user device is presented with interface elements that cause a server to perform one or more operations on the combination of content items (e.g., creating a layered image, initiating a transaction to obtain a set of products, etc.).

Different users often have different experiences within the same type of interactive environment. For instance, different users having different levels of expertise with a particular application or online service may have varying levels of difficulty in reaching desirable outcomes via the application or online service. Such outcomes could include effectively performing desired functionality, efficiently locating desirable content, etc. Modifying the interactive environment of an online service to account for these different experiences could enhance the ability of any given user (or type of users) to utilize the online service as intended.

But existing solutions have limited capability to customize an interactive environment according to user experiences. For instance, experience is latent in the minds of users, and is therefore difficult to measure directly. Although surveys could be used to evaluate different users' experience with respect to a particular application or service, these surveys could suffer from low response rates. And even the responses that are received simply identify what a user stated about his or her experience, which is an opinion colored by a user's subjective (and unreliable) memory, rather than analyzing interactions or series of interactions that actually occurred within the interactive environment. Furthermore, given a large number of variables with respect to an experience with an interactive environment (e.g., arrangement of content, layout of interface controls, etc.), simply surveying a user about his or her opinion is more likely to produce high-level assessments about aspects that the user can remember, rather than providing detailed, reliable insights as to how particular aspects of the interactive environment could be modified to better suit a user's needs.

SUMMARY

Certain embodiments involve applying machine-learning models to interaction data for evaluating and thereby modifying an interface for interacting with electronic content delivery systems. In one example, an environment evaluation system could be included in or communicatively coupled to a host system that hosts an online platform with which user devices interact. The environment evaluation system accesses interaction data generated by interactions between the host platform and one or more user devices. The environment evaluation system computes, with a state prediction model, probabilities of transitioning from a click state represented by the interaction data to various predicted next states. The environment evaluation system computes an interface experience metric for the click with an experience valuation model. To do so, the environment evaluation system identifies base values for the click state and the predicted next states. The environment evaluation system computes value differentials for between the click state's base value and each predicted next state's base value. Value differentials indicate qualities of interface experience, where a first value differential for a movement from the click state to one predicted next state could indicate a different quality of experience as compared to a second value differential for a movement from the click state to a different predicted next state. The environment evaluation system determines the interface experience metric from a summation operation, where the summation includes the base value for the current click state as well as value differentials for the various predicted next states, where the value differential are weighted with the probabilities computed with the state prediction model. The environment evaluation system transmits the interface experience metric to an online platform, which can cause interface elements of the online platform to be modified based on the interface experience metric.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

DETAILED DESCRIPTION

Figure 1:
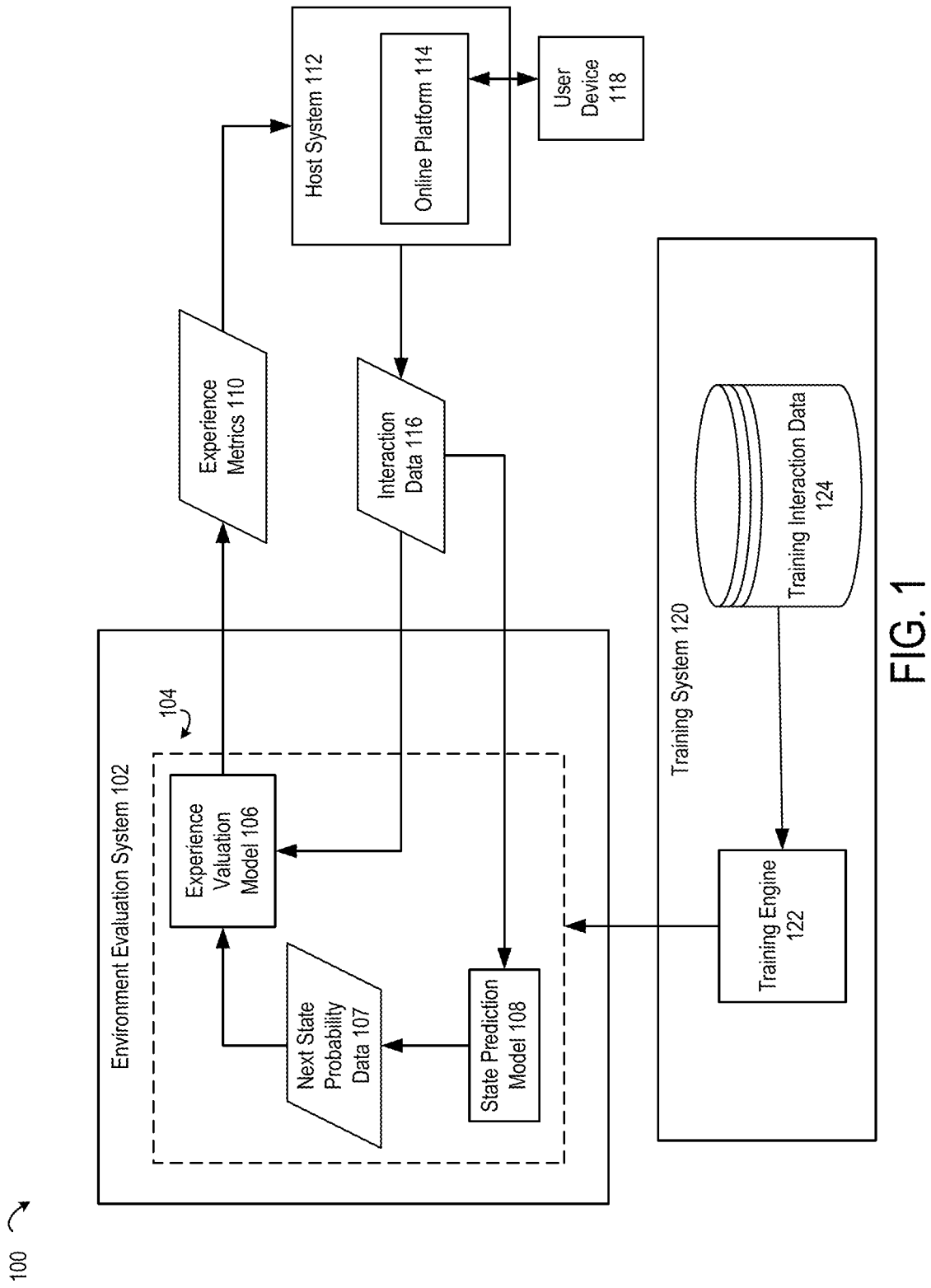
FIG. 1 depicts an example of a computing environment in which an online experience evaluation system can be used to evaluate and facilitate modifications to an interactive user experience in an online platform, according to certain embodiments of the present disclosure.

Certain embodiments involve applying machine-learning models to interaction data for evaluating experiences in interactive user experiences, which can facilitate modifying one or more interfaces for utilizing an interactive environment provided by electronic content delivery systems. For instance, an environment evaluation system computes an interface experience metric from interaction data generated by an online content platform. To do so, the environment evaluation system applies one or more machine-learning models to the interaction data and thereby computes an interface experience metric. In one example, the interface experience metric could indicate a poor user experience, such as a layout of interface elements increasing the difficulty of performing one or more desired functions in a software application provided by the online platform. The online platform can be customized to a user (or otherwise modified) based on the interface experience metric by, for example, modifying the layout of interface elements to reduce a particular user's level of difficulty with the software application (e.g., by hiding more expert-level features and increasing the prominence of novice-user features).

The following non-limiting example is provided to introduce certain embodiments. In this example, an environment evaluation system, which is included in or in communication with an online platform, executes one or more modeling algorithms that allow for enhancing interactive user experiences at the online platform. To do so, the environment evaluation system accesses interaction data from the online platform, where the interaction data is generated by interactions that occur when user devices use one or more interfaces provided by the online platform. The environment evaluation system applies a state prediction model to the interaction data and thereby computes probabilities of transitioning from a particular click state represented by the interaction data to various predicted next states. An example of a click state is a state of an electronic environment, such as a particular set of functions and content presented to a user via an interface, as of the most recent action performed by a user device in the electronic environment.

Continuing with this example, the environment evaluation system uses these transition probabilities as inputs to an experience valuation model that computes a value of the interface experience metric for the click state. For instance, the environment evaluation system identifies a current base value for the click state and various subsequent base values for the various predicted next states. A base value is a score indicating a degree of progress toward one or more goals that can be achieved via the electronic environment (e.g., generating certain types of content with various functions accessible via an interface, progress toward a completing an electronic transaction facilitated by use of the electronic environment, etc.). The environment evaluation system also computes various value differentials, each of which is based on a difference between the current base value and a subsequent base value, indicating different qualities of interface experience represented by a transition between the current click state and a possible predicted next state. The environment evaluation system computes the interface metric corresponding to the current click state from a summation operation involving the current base value and the value differentials for different states weighted with the computed probabilities of transitioning to these states. The environment evaluation system transmits or otherwise provides the interface experience metric to one or more computing systems that are used to host or configure the online platform.

In some embodiments, providing the interface experience metric to systems that host online platforms can allow various interface elements of the interactive computing environment to be customized to particular users, modified to enhance the experience of certain types of users, or some combination thereof. In one example, an online tool may be configured with different modes for different types of users, such as a "guided" mode and an "expert" mode. The guided mode could include menus or other interface elements that present basic features more prominently than advanced features used by experts, could provide pop-up instructions for certain features, etc. One or more of the "guided" mode or the "expert" mode could be configured based on an interface experience metric. For instance, if the interface experience metric indicates that prominently featuring advanced tools in menus is more likely to diminish the experience of users in a "novice" group, the guided mode can hide or de-emphasize these problematic features for users in that group.

As described herein, certain embodiments provide improvements to interactive computing environments by solving problems that are specific to online platforms. These improvements include more effectively configuring the functionality of an interactive computing environment based on accurate and precise evaluations of user experience within the interactive computing environment. Facilitating these experienced-based modifications involves identifying problematic or beneficial states of an interactive computing environment, which is particularly difficult in that the states of an interactive computing environment involve instantaneous transitions between different types of states (e.g., states corresponding to a combination of different content layouts, interface elements, etc.) that are traversed during a journey through the environment, where any given state may not last long from the perspective of the user. Thus, evaluating an experience within an interactive computing environment is uniquely difficult because these ephemeral, rapidly transitioning states could significantly impact a user's online experience even though any given state may not be memorable enough for a user to recall or evaluate after the fact (e.g., via a survey).

Because these state-evaluation problems are specific to computing environments, embodiments described herein utilize machine-learning models and other automated models that are uniquely suited for assessing computing environments. For instance, a computing system automatically applies various rules of a particular type (e.g., various functions captured in one or more models) to clickstream data or other interaction data and thereby computes objective measurements of online experience, sometimes in a real-time manner. The measurements are objective at least because a computing system applies these rules in an automated manner, rather than relying on subject memories and judgments. The objective measurements are usable for enhancing a computing environment by, for example, modifying interface elements or other interactive aspects of the environment. Using one or more models described herein can therefore allow for a more accurate and precise evaluation of which states of an interactive environment are more likely to help or hinder an intended outcome of using the online platform. Consequently, certain embodiments more effectively facilitate modifications to a computing environment that facilitate desired functionality, as compared to existing systems.

As used herein, the term "online platform" is used to refer to an interactive computing environment, hosted by one or more servers, that includes various interface elements with which user devices interact. For example, clicking or otherwise interacting with one or more interface elements during a session causes the online platform to manipulate electronic content, query electronic content, or otherwise interact with electronic content that is accessible via the online platform.

As used herein, the term "interface element" is used to refer to a control element in a graphical user interface that performs, in response to an interaction from a user device, one or more operations that change a state of an interactive computing environment. Examples of changing the state of an interactive computing environment include selecting a function from a menu interface element, entering query terms in a field interface element used for searching content, etc.

As used herein, the term "interaction data" is used to refer to data generated by one or more user devices interacting with an online platform that describes how the user devices interact with the online platform. An example of interaction data is clickstream data. Clickstream data can include one or more data strings that describe or otherwise indicate data describing which interface features of an online service were "clicked" or otherwise accessed during a session. Examples of clickstream data include any consumer interactions on a website, consumer interactions within a local software program of a computing device, information from generating a user profile on a website or within a local software program, or any other consumer activity performed in a traceable manner. Another example of interaction data includes system-to-system interactions between a user device and server hosting an online platform (e.g., data describing transmission of network addresses, establishing communications, API calls, etc.).

As used herein, the term "interface experience metric" is used to refer to data describing or otherwise indicating a quality of an interactive user experience in the online platform.

As used herein, the term "click state" is used to refer to a state of an interactive computing environment as of a particular click or other interaction with an interface element. For instance, a click or other interaction that submits a query causes query results to be displayed with an interactive computing environment. The click state, in this example, is the display of query results resulting from the query-submission click.

As used herein, the term "next state" is used to refer to a state that is available within the online platform following a particular click state. In the example above, a click state that includes displaying query results can have a first next state that includes clicking one of the results, a second next state that includes inserting additional query parameters, a third next state that includes clicking a "back" button to return to the original query screen, etc.

As used herein, the term "state prediction model" is used to refer to program code that implements one or more algorithms for computing probabilities of different states. In some embodiments, the state prediction model includes one or more neural networks or other machine-learning models having tunable parameters. The parameters are tuned, via training process, to improve the predictions of next states when the state prediction model is applied to a set of interaction data.

As used herein, the term "experience valuation model" is used to refer to program code that implements one or more algorithms for computing an interface experience metric. The algorithms include one or more functions with tunable parameters that, when applied to a set of interaction data and probabilities computed with a state prediction model, compute an interface experience metric for an interactive computing environment.

Referring now to the drawings, FIG. 1 depicts an example of computing environment 100 in which an environment evaluation system 102 evaluates and, in some cases, facilitates modifications to an interactive user experience in an online platform 114 provided by a host system 112. In various embodiments, the computing environment 100 includes one or more of the environment evaluation system 102, the host system 112, and a training system 120. The environment evaluation system 102 applies a trained experience metric computation model 104, which includes one or more of an experience valuation model 106 and a state prediction model 108, to interaction data 116 generated by interactions between the online platform 114 and a user device 118.

Applying the experience metric computation model 104 to the interaction data 116 computes one or more experience metrics 110 that indicate a quality of the interactive user experience in the online platform 114. Because environment evaluation system 102 applies these models in an automated manner based on observable data (e.g., clickstream data), the resulting experience metrics 110 provide objective measures of the quality of a particular experience within an online computing environment.

The environment evaluation system 102 provides the experience metrics 110 to the host system 112. In some embodiments, providing the experience metrics 110 to the host system 112 causes one or more features of the online platform to be changed such that subsequent interactive user experiences are enhanced for various user devices 118.

For example, the environment evaluation system 102 receives interaction data 116 that is generated by one or more user devices 118 interacting with the online platform 114. An example of interaction data 116 is clickstream data. Clickstream data can include one or more data strings that describe or otherwise indicate data describing which interface features of an online service were "clicked" or otherwise accessed during a session. Examples of clickstream data include any consumer interactions on a website, consumer interactions within a local software program of a computing device, information from generating a user profile on a website or within a local software program, or any other consumer activity performed in a traceable manner. Another example of interaction data 116 includes system-to-system interactions between the user device 118 and a host system 112 that may not involve user input (e.g., sending network addresses, establishing communications, API calls, etc.). Another example of interaction data 116 includes a user identifier generated through interactions between the user device 118 and an online platform 114 of the host system 112.

In some embodiments, the host system 112 could include one or more servers that log user activity in the online platform 114 and transmit, to the environment evaluation system 102, the interaction data 116 describing the logged activity. In additional or alternative embodiments, a user device 118 could execute one or more services (e.g., a background application) that log user activity in the online platform 114 and transmit, to the environment evaluation system 102, the interaction data 116 describing the logged activity.

In these various embodiments, logging the user activity includes, for example, creating records that identify a user entity (e.g., the user device 118 or a credential used to access the online platform 114), timestamps for various interactions that occur over one or more sessions with the online platform 114, and event identifiers that characterize the interaction. Examples of event identifiers include an identifier of a particular interface element that was clicked or otherwise used, an identifier of a particular group of interface elements to which an interface element that was clicked or otherwise used belongs, etc.

In some embodiments, the interaction data 116 includes multiple journeys, where a journey includes a set of clicks over one or more sessions within the online platform 114. A given click can be mapped to a given type of event described above. For instance, a click on directed to a particular interface element or a member of a group of interface elements can be classified as a particular event for that interface element or group of interface elements. A journey of interface experiences may represent a discrete path of click states and corresponding states when a user device 140 interacts with online platform 114. For a non-limiting example, a particular user could utilize user device 140 to create a journey which includes various events, such as clicking on a particular portion of content, expanding detailed information on the portion of content, clicking on a search function, and clicking to close the session with online platform 114.

In some embodiments, the environment evaluation system 102 computes one or more experience metrics 110 from the interaction data 116 by executing code that performs various operations from the state prediction model 108 and the experience valuation model 106. The state prediction model 108 is used to compute the probabilities of moving from a current click state indicated by the interaction data to various next states that are available within the online platform 114. A click state is a state of the interactive user experience from the online platform 114 as of a particular click or other interaction. Examples of click states include displaying a certain menu within a content creation application, presenting a certain dialogue within an online application, entering a particular field of a search form in a query application, viewing a web page for a particular product available via an e-commerce site, etc.

The environment evaluation system 102 computes next state probability data 107 by applying the state prediction model 108, such as a trained neural network provided by training system 120, to the interaction data 116. In a simplified example, a given click state, such as displaying a list of search results, could include multiple options for next states, such as clicking on different links in the list of search results, clicking a "back" button to return to a search page, refining the search terms by entering data into another search field, etc. The next state probability data 107 includes a first probability of transitioning from a given click state (e.g., the list of search results) to a first predicted next state (e.g., clicking on a first search result), a second probability of transitioning from the given click state (e.g., the list of search results) to a second predicted next state (e.g., returning to the original search page via a "back" button), a third probability of transitioning from the given click state (e.g., the list of search results) to a third predicted next state (e.g., refining the search by entering another search field), etc. The trained state prediction model 108 predicts a given probability for a given next state based on a history of previous click states represented by the interaction data 116.

To compute experience metrics 110, the environment evaluation system 102 applies an experience valuation model 106 to the next state probability data 107 and the interaction data 116. In one example, the experience valuation model 106 computes or otherwise identifies base values for various states of the interactive user experience from the online platform 114. In some embodiments, a base value indicates a baseline quality of the interactive user experience associated with a particular click state, without regard to prior or subsequent click states. Applying the experience valuation model 106 can include computing value differentials between a current click state and various other click states available in the online platform. For instance, a value differential, which could be the difference in the base value of a current click state and a potential next click state, is a data point that indicates whether a transition from the current click state to the potential next click state would increase the quality of a user's experience in an online platform (e.g., because the potential next click state has a higher base value) or decrease the quality of a user's experience in an online platform (e.g., because the potential next click state has a higher base value). In a simplified example, for a given pair of value differentials that involves a respective pair of state transitions, a first value differential being different from a second value differential could indicate that an interface experience involving the first transition between states has a difference in quality (e.g., better or worse end-user experience) than an interface experience involving the second transition between states. In various use cases, a set of value differentials can indicate qualities of experience that are higher or otherwise indicate a better user experience, qualities of experience that are lower or otherwise indicate a worse user experience, qualities of experience that are the same or otherwise indicate a similar user experience, or some combination thereof.

Figure 2:
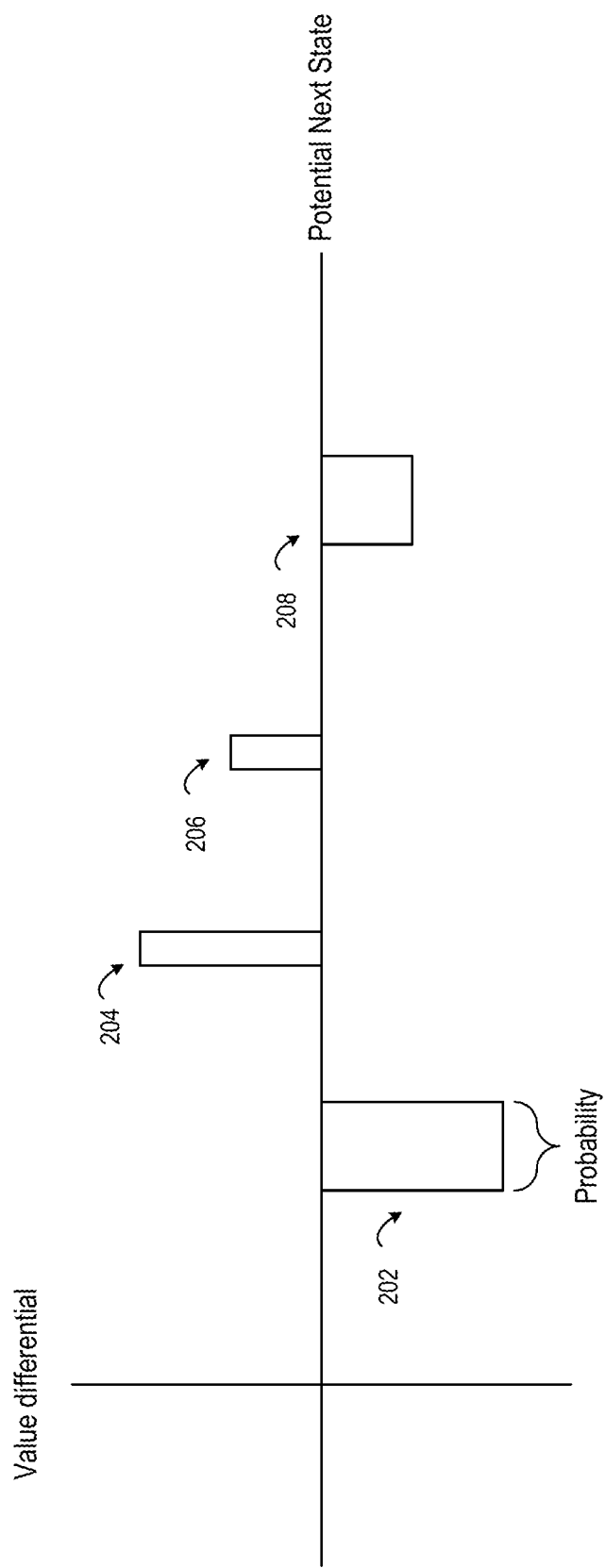
FIG. 2 depicts an example of visualizations of datasets used by the online experience evaluation system of FIG. 1 to compute an interface experience metric, according to certain embodiments of the present disclosure.

The environment evaluation system 102 computes a given interface experience metric, to be included in the experience metrics 110, from a combination of these various value differentials and the probabilities obtained from the next state probability data 107. (In some embodiments, additional factors can be included in this computation, as described in detail herein.) For instance, FIG. 2 depicts a simplified example involving four potential next states 202, 204, 206, and 208. The height of each rectangle for a respective one of the potential next states 202, 204, 206, and 208 indicates a magnitude of either a positive value, indicating an increased interface experience metric from the current click state to the potential next state, or a negative value, indicating a decreased interface experience metric from the current click state to the potential next state. The width of each rectangle indicates a probability for a potential next state, as computed by the state prediction model 108. Thus, each rectangle either has a "positive area" or a "negative area," where an area is the product of the value differential and the probability. An interface experience metric for a given state could include a sum of these positive and negative areas. Thus, if the set of potential next states includes more high-probability next states having negative value differentials, such as the potential next states 202 and 208, the interface experience metric would be negative.

Returning to FIG. 1, one or more of the experience valuation model 106 and the state prediction model 108 are trained with a training system 120. The training system 120 includes one or more computing devices that executes one or more training engines 122. A training engine 122 uses training interaction data 124 to train one or more models. The training engine 122 provides these trained models to the environment evaluation system 102. Examples of training processes are described in further detail herein. The training interaction data 124 could be, for example, historical interaction data generated in the same manner as the interaction data 116. In some embodiments, interaction data 116 is added to a set of training interaction data 124 subsequent to (or concurrently with) the metric computation model 104 being applied to the interaction data 116. The training engine 122 could use the training interaction data 124 having additional interaction data 116 to refine one or more aspects of the metric computation model 104 (e.g., the experience valuation model 106, the state prediction model 108, or both).

The environment evaluation system 102 may transmit experience metrics 110 to the host system 112. In some embodiments, doing so causes the host system 112 to modify an interactive user experience of the online platform 114 based on the experience metrics 110. In one example, a development platform could rearrange the layout of an interface so that features or content associated with higher-quality experience metrics 110 are presented more prominently, features or content associated with lower-quality experience metrics 110 are presented less prominently, or some combination thereof. In various embodiments, the development platform performs these modifications automatically based on an analysis of the experience metrics 110, manually based on user inputs that occur subsequent to presenting the experience metrics 110, or some combination thereof.

In some embodiments, modifying one or more interface elements is performed in real time, i.e., during a session between the online platform 114 and a user device 118. For instance, an online platform 114 may include different modes, in which a first type of interactive user experience (e.g., placement of menu functions, hiding or displaying content, etc.) is presented to a first type of user group and a second type of interactive user experience is presented to a second type of user group. If, during a session, an interface experience metric is computed that indicates that operating in the first mode for a particular user is causing an undesirable experience, the online platform 114 could switch to the second mode in an effort to improve the user experience. The environment evaluation system 102 can continue to evaluate the online experience during the session and thereby determine if additional changes to the interactive computing environment are warranted. In other embodiments, the interactive computing environment is modified after a given session is complete and the interface experience metric computed for the session is transmitted to the host system 112.

One or more computing devices are used to implement the environment evaluation system 102 and the host system 112. For instance, the environment evaluation system 102, the host system 112, or both could include a single computing device, a group of servers or other computing devices arranged in a distributed computing architecture, etc.

The online platform 114 can be any suitable online service for interactions with the user device 118. Examples of an online platform include a content creation service, an electronic service for entering into transactions (e.g., searching for and purchasing products for sale), a query system, etc. In some embodiments, one or more host systems 112 are third-party systems that operate independently of the environment evaluation system 102 (e.g., being operated by different entities, accessible via different network domains, etc.). In additional or alternative embodiments, one or more host systems 112 include an environment evaluation system 102 as part of a common computing system.

The user device 140 may be any device which is capable of accessing an online service. For non-limiting examples, user device 140 may be a smart phone, smart wearable, laptop computer, desktop computer, or other type of user device.

Figure 3:
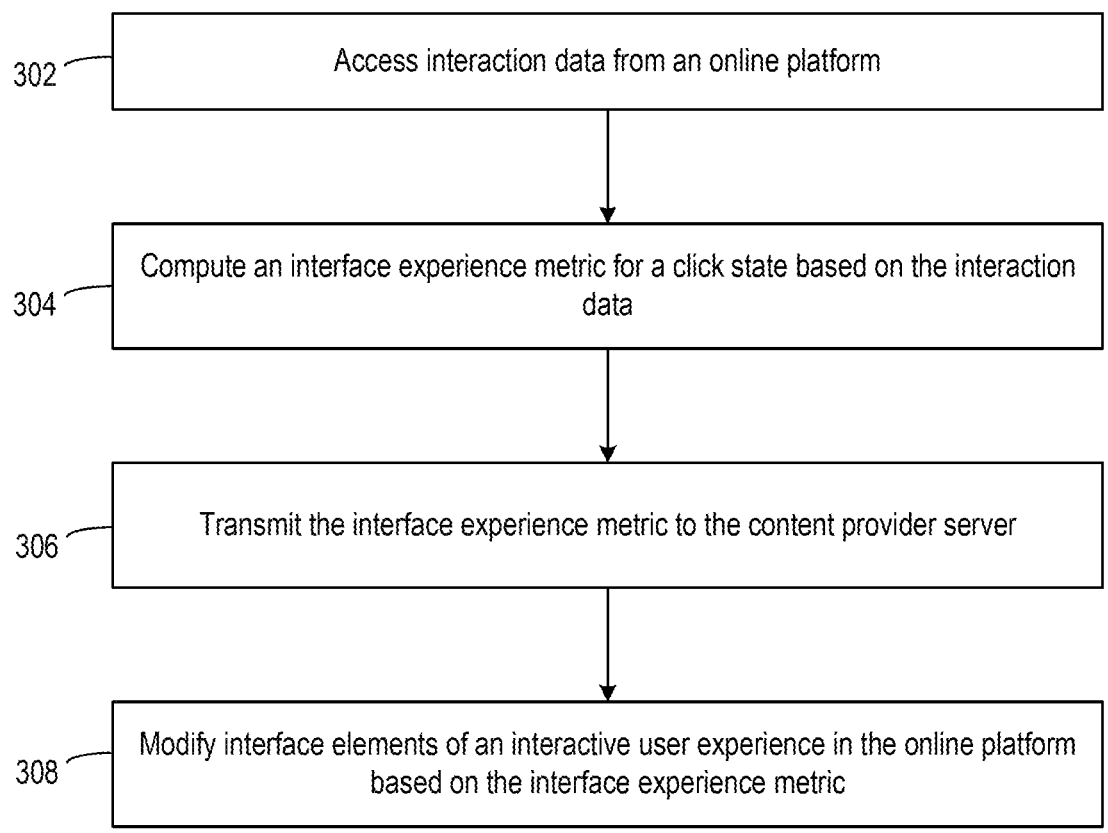
FIG. 3 depicts an example of a process for facilitating the modification of an interactive user experience based on one or more interface experience metrics, according to certain embodiments of the present disclosure.

FIG. 3 depicts an example of a process 300 for facilitating the modification of an interactive user experience based on one or more interface experience metrics, according to certain embodiments of the present disclosure. One or more computing devices (e.g., the computing environment 100) implement operations depicted in FIG. 3 by executing suitable program code. For illustrative purposes, the process 300 is described with reference to certain examples depicted in the figures. Other implementations, however, are possible.

At block 302, the process 300 involves accessing interaction data from an online platform. For instance, interactions between a user device 118 and an online platform 114 may create interaction data 116. The environment evaluation system 102 accesses interaction data 116 from a suitable non-transitory computer-readable medium or other memory device. In some embodiments, interaction data 116 is stored on one or more non-transitory computer-readable media within host system 112. The environment evaluation system 102 accesses the interaction data 116 via suitable communications with a host system 112 (e.g., a push or batch transmission from the host system 112, a pull operation from the environment evaluation system 102, etc.). In additional or alternative embodiments, the environment evaluation system 102 and the host system 112 are communicatively coupled to a common data store (e.g., a set of non-transitory computer-readable media, a storage area network, etc.). The environment evaluation system 102 retrieves the interaction data 116 from the data store after the host system 112 stores the interaction data 116 in the data store. In additional or alternative embodiments, interaction data 116 is stored at user devices 118 and transmitted to the environment evaluation system 102 directly, without involving the host system 112. For instance, a background application on each user device 118 could transmit a set of interaction data 116 for that user device 118 to the environment evaluation system 102.

At block 304, the process 300 involves computing an interface experience metric for a click state based on the interaction data 116. For instance, the environment evaluation system 102 may apply experience metric computation model 104 to interaction data 116 to compute the interface experience metric. In some embodiments, the environment evaluation system 102 computes a set of interface experience metrics for a journey through an interactive user experience within the online platform. For instance, a journey could include different click states, which correspond to different states of a user interface provided by an online platform during one or more sessions with a user device 118. The environment evaluation system 102 could compute, for each of these click states, a respective value of the interface experience metric. The interface experience metric dataset over a journey can indicate whether an end user experience is improving or deteriorating over time. Detailed examples of computing the interface experience metric are described herein with respect to FIGS. 4-6.

At block 306, the process 300 involves transmitting the interface experience metric to the content provider service. For instance, the interface experience metric computed at block 304 may be transmitted to host system 112 via a local area network, a wide area network, or some combination thereof. In some embodiments, multiple interface experience metrics may be aggregated and transmitted as experience metrics 110.

At block 308, the process 300 involves modifying interface elements of an interactive user experience in an online platform based on interface experience metrics. For instance, a host system 112 includes one or more computing devices that can modify interface elements of online platform 114 based on received experience metrics 110. In one example, an interface element may include, but is not limited to, visual content, such as colors and layout, available click actions in certain click states, and design features, such as menus, search functions, and other elements. In some embodiments, the interface elements may be modified in a particular manner when lower user experience metrics 110 are received. In other embodiments, the interface elements may be modified in a different particular manner when higher user experience metrics 110 are received. The interface elements may be modified in any suitable manner including, but not limited to, the examples discussed above with respect to FIG. 1.

Figure 4:
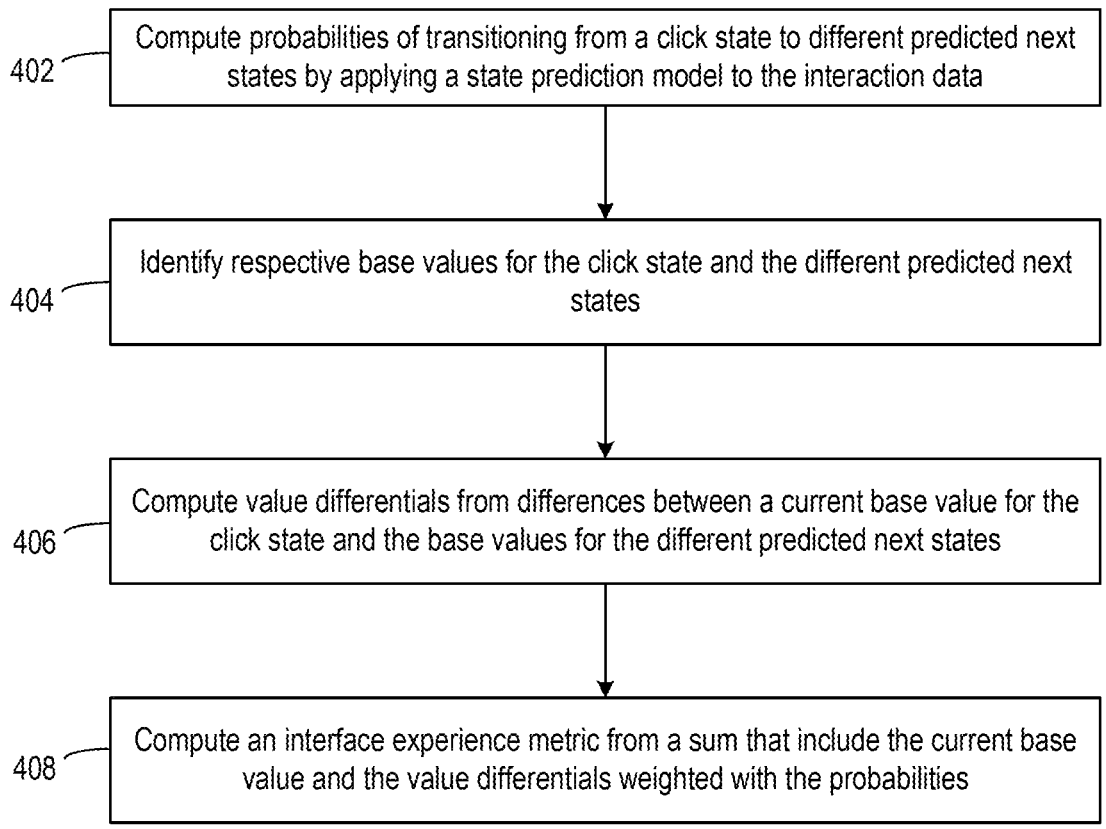
FIG. 4 depicts an example of a process for computing interface experience metrics used by the process of FIG. 3, according to certain embodiments of the present disclosure.

FIG. 4 depicts an example of process 400 for computing interface experience metrics, according to certain embodiments of the present disclosure. The process 400 can be used to implement block 304 of the process 300. One or more computing devices (e.g., the computing environment 100) implement operations depicted in FIG. 4 by executing suitable program code (e.g., the environment evaluation system 102). For illustrative purposes, the process 400 is described with reference to certain examples depicted in the figures. Other implementations, however, are possible.

At block 402, the process 400 involves computing probabilities of transitioning from a click state to different predicted next states by applying a state prediction model to interaction data. One or more computing devices execute program code from the environment evaluation system 102 to implement block 402. For instance, the environment evaluation system 102 provides a set of interaction data to an input layer of a neural network that implements the state prediction model 108. The neural network is trained to compute probabilities of different states based on a set of interaction data. The output of the neural network that implements the state prediction model 108 is the set of probabilities of transitioning to different next states from a given click state associated with the interaction data provided to the input layer.

Figure 5:
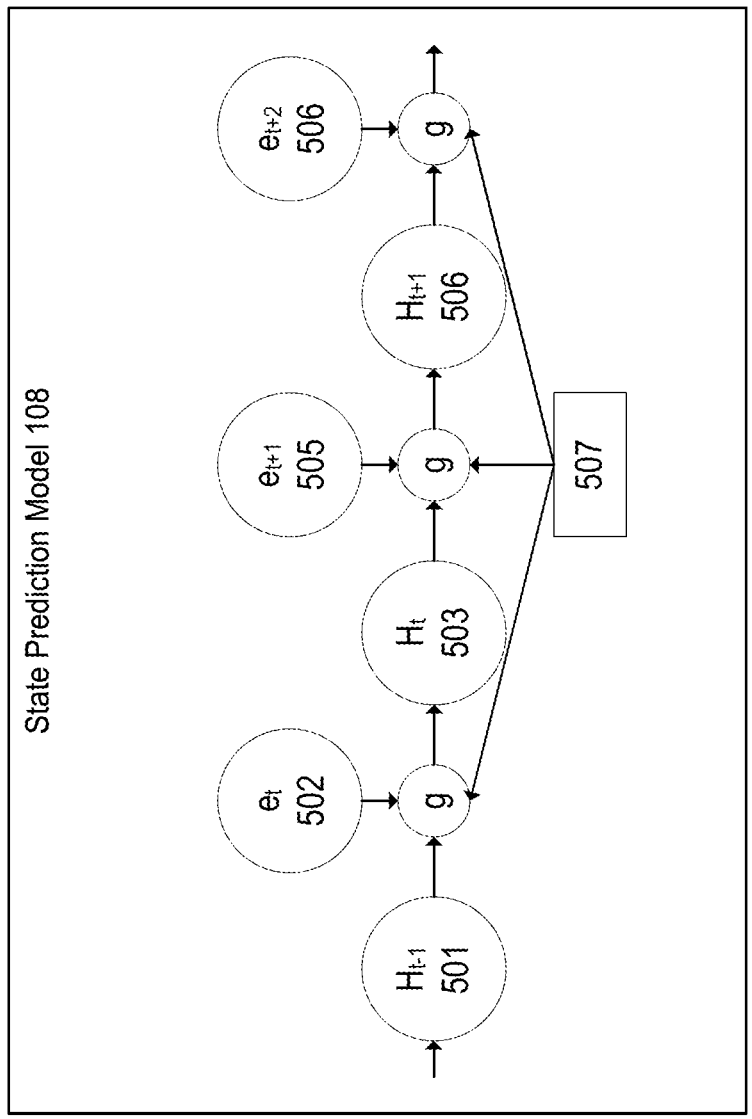
FIG. 5 depicts an example of a state prediction model used by the process of FIG. 4, according to certain embodiments of the present disclosure.

For instance, in FIG. 5, a state prediction model 108 computes probabilities based on encoded information from a historical sequence of events 501 in a hidden cell state g 507. In this example, 50 possible next states may exist for a current click state, i.e., the state of an interface in a particular interactive user experience. The state prediction model 108 computes the probabilities of the possible next states, respectively, based on the historical sequence of events in previous sessions. In this example, a sequence of events $[E_1, E_2, \ldots E_t]$ represented by elements 502, 505, and 506 are observed in a given journey (e.g., a browsing session or set of sessions) up to time t, where $E_i \in \varepsilon = \{e_1, e_2, \ldots, e_{|\varepsilon|}\}$. A vector $\vec{H}_{t-1}$ 501 of d dimensions encodes historical information from the sequence $[E_1, E_2, \ldots E_{t-1}]$. The state at t 503 may be represented as a tuple, $S_t = (\vec{H}_{t-1}, E_t)$. As illustrated by FIG. 5, the relationship between the encoded historical information and the predicted next state is such that, $S_t \oplus E_{t+1} = S_{t-1}$; $(\vec{H}_{t-1}, E_t) \oplus E_{t+1} = (\vec{H}_t, E_{t+1})$; and $(\vec{H}_{t-1}, E_t) \oplus E_{t+1} = (g(\vec{H}_{t-1}, E_t), E_{t+1})$.

In some embodiments, the state prediction model 108 is a Long Short-Term Memory ("LSTM") network. In other embodiments, a different neural network construction can be used. For example, the state prediction model may be recurrent neural network with LSTM module that is implemented for the task of next-event prediction. The next-event prediction task is used to simulate the state transition function of the environment. For multiple input sequence of events, a one step ahead sequence is predicted.

In some embodiments, a recurrent neural network used to implement the state prediction model 108 has an input layer, an embedding layer, an LSTM layer, and a fully connected output layer. The input layer receives data in the form of sequences of events (i.e., journeys having sets of interaction data). In the embedding layer, the event may be embedded into a latent space of multiple dimensions (e.g., 150 dimensions). An LSTM layer, which includes multiple hidden dimensions (e.g., 200 dimensions), and acts as the memory unit of the state prediction model 108. The output from the LSTM layer is provided to a fully connected dense layer of the state prediction model 108. The fully connected dense layer produces an output of size $|\varepsilon|$ through, for example, a softmax activation at each time-step of the sequence provided to the input layer. An example of the output for each time-step is a probability distribution vector over a plurality of possible next events.

Returning to FIG. 4, at block 404, the process 400 involves identifying respective base values for the click state and the different predicted next states. One or more computing devices execute program code from the experience metric computation model 104 to implement block 404. For instance, executing the program code causes a computing device to retrieve various base values from a non-transitory computer-readable medium. A base value may be assigned to a click state based on a distance between the click state and a goal state. A goal state can be a state of an interactive user experience that could conclude a given journey in a satisfactory manner for the user. Examples of a goal state include, but are not limited to achieving use of an intended image edit using an intended tool in a graphical manipulation application, or making an online purchase. A "distance" between a click state can be the number of click states associated with a particular sequence of click states from a goal state. For a non-limiting example, clicking on a tool menu to browse editing tools would be more distant from the goal state than selecting the intended tool for use in a graphical manipulation application. In some embodiments, the base value of a click state is determined by a proximity of the click state to the goal state. The shorter distance between a click state and the goal state may indicate that the click state should be characterized with a greater base value, since the click state is more likely to lead to the goal state than another click state having a further distance from the goal state. Similarly, base values of various next states may be greater than or less than a base value for a given click state based at least in part on the respective proximities of the next states to the goal state.

At block 406, the process 400 involves computing value differentials from differences between a current base value for the click state and the base values for the different predicted next states. One or more computing devices execute program code from the experience metric computation model 104 to implement block 406. For instance, experience metric computation model 104 accesses a current base value identified at block 404 for a current click state $e_i$, which can be represented by $B(e_i)$. Additionally, the experience metric computation model 104 accesses base values identified at block 404 for various predicted next click states $e_j$, which can be represented by $B(e_j)$. In some embodiments, the experience metric computation model 104 may compute the differentials for all predicted next states $e_j$ and the current click state $e_i$. This computation can broadly be formulated as $B(e_j)-B(e_i)$. In other embodiments, a different comparison of the respective base values may be performed.

At block 408, the process 400 involves computing an interface experience metric from a sum that includes the current base value, and the value differentials weighted with the probabilities of transitioning the different predicted next states. One or more computing devices execute program code from the experience metric computation model 104 to implement block 408.

The experience metric computation model 104 may use the differential values computed in block 406 as part of the computation. In one example, a summation of the differential values between the different predicted next states and the current states may be formulated by $\Sigma_{j=1}^{|\varepsilon|}\Delta B_{i,j}$, where the summation includes a first difference between the current base value $B(e_i)$ and a base value for a first one of the predicted next states $B(e_j)$, a second difference between the current base value $B(e_i)$ and a base value for a second one of the predicted next states $B(e_j)$, and so on. The experience metric computation model 104 applies a weight to each difference between the current base value $B(e_i)$ and a base value for a given next state $B(e_j)$. The weight indicates a probability of transitioning to the next state. The weighted differential can be formulated as shown in Equation (1) below:

$$\Delta B_{i,j} = \omega_j \hat{P}(S_t, S_t \oplus e_j)(B(e_j)-B(e_j)) \quad (1)$$

In Equation (1), the term $\omega_j$ is a tuning parameter. The weight term $\hat{P}(S_t, S_t \oplus e_j)$ represents a probability of transitioning from a particular state to a predicted next state, as computed at block 402. In this example, a positive value of $\Delta B_{i,j}$ indicates that the predicted next state $e_j$ is closer to the goal state than the current click state $e_i$. Likewise, a negative value of $\Delta B_{i,j}$ indicates that the predicted next state $e_{i,j}$ is more distant from the goal state than the current click state $e_i$. The magnitude of $\Delta B_{i,j}$ quantitatively indicates how much the predicted next state will move towards or away from the goal state.

Continuing with this example, to compute the interface experience metric, the experience valuation model 106 combines a summed set of values of $\Delta B_{i,j}$ outputted from Equation (1) with a current base value of a current click state. In some embodiments, this operation can be formulated as shown below in Equation (2).

$$XV(S_t) = \omega_0 B(e_i) + \sum_{j=1}^{|\varepsilon|} \Delta B_{i,j}. \quad (2)$$

In Equation (2), the term $XV(S_t)$ represents an interface experience metric and the term $\omega_0$ is an additional tuning parameter.

In additional or alternative embodiments, computing the interface experience metric $XV(S_t)$ also involves a transition importance value. A transition importance indicates the statistical significance of a specific click state present in goal state journeys. For example, if selecting a region of canvas occurs at statistically higher rates in journeys which achieve the goal state, it would be assigned a greater transition importance than if it was evenly distributed between goal and non-goal journeys. One example of incorporating a transition importance TI into the computation of an interface experience metric is provided in Equation (3) below:

$$XV(S_t) = \omega_0 B(e_i) + \sum_{j=1}^{|\varepsilon|} TI(e_i, e_j)\Delta B_{i,j}. \quad (3)$$

In some embodiments, various transition importance values are determined by analyzing a cluster of historical journeys of interaction data 116 for click states. The analysis is used to determine which click states within a given journey are statistically more likely to result in a goal state. For instance, if certain journeys include both goal states and a given click state and other journeys lack both goal states and the same click state, the statistical analysis could indicate that the presence of a click state in a journey is more likely to result in a goal state. In another example, if a particular transition occurs with a similar frequency in journeys that include a given goal state (e.g., journeys that result in a purchase via an e-commerce service) and in journeys that lack the goal state (e.g., journeys that do not result in a purchase), that transition is less important than a transition that occurs with different frequencies in the journeys having the goal state and the journeys lacking the goal state.

In some embodiments, the transition importance is assigned a value based on the frequency of occurrence in goal state journeys. In one example, if a first click state corresponding to a set of detailed search results occurs more often in journeys that result in a goal state as compared to a second click state corresponding to a set of general search information, a higher transition importance value can be assigned to the first goal state. Thus, a click state which results in arriving in the goal state would have the higher transition importance.

In an example involving a particular set of interaction data, such as a certain user or user group's journey, the environment evaluation system 102 identifies different transition importance values for transitioning to different predicted next states from a given click state. Identifying a transition importance includes determining, from historical interaction data, a statistical likelihood of a transition leading to a target outcome. As indicated by the example of Equation (3), a given value differential for a transition can also be weighted with a respective transition importance (in addition to a transition probability) for that transition. Thus, an interface experience metric is computed using value differentials weighted with respective transition importance values in addition to respective transition probabilities.

In some embodiments, a given transition could have different transition importance values depending on a group to which a particular user of the online platform 114 is assigned. In a simplified example, moving from a "search" web page to a "purchase" web page may be less significant (and thereby have a lower transition importance value) for users in the age range of 20-30 and more significant for users in the age range of 40-50. For instance, when the experience metric computation model 104 is trained, a first cluster generated from a first set of historical interaction data could represent a first set of journeys and a second cluster generated from a second set of historical interaction data could represent a second set of journeys. Each cluster includes points defined by representation vectors, where the points are located in a vector space having a dimensionality corresponding to the representation vector's dimensionality. Thus, each cluster represents similarities with respect to certain entities, journeys, or some combination thereof.

In some embodiments, representation vectors are computed from entity data associated with user devices 118, interaction data involving the user devices, or both. For instance, representation vectors can be computed from available metrics data. In a simplified example involving e-commerce services, available metrics data could include frequency of purchase by customers, amount of purchase, frequency distribution of actions customers perform on the site, duration spent on certain interactions, external demographics, psychographic type variables, etc. In additional or alternative embodiments, representation vectors are computed from respective journeys through an interactive computing environment such as the online platform 114. Journeys could be grouped based on, for example, similarity in end state (e.g., journeys including or lacking a goal state such as a purchase), similarity in state transitions leading to the end state, or some combination thereof.

Training the experience metric computation model 104 could include performing a first statistical analysis on the first set of historical interaction data to identify a first set of transition importance values for different state transitions and performing a second statistical analysis on the second set of historical interaction data to identify a second set of transition importance values for different state transitions.

Continuing with this example, a computing system, such as the host system 112 or the environment evaluation system 102, could compute a representation vector for a set of interaction data, such as clickstream data for a particular user during a given session or a given set of sessions. The representation vector can characterize the user based on his or her journey through an interactive computing environment. To determine a user group for this user, the computing system accesses the vector space in which different clusters indicate different user groups. The computing system selects, based on the representation vector defining a point that is closer to the first cluster than the second cluster, a transition importance dataset that includes the first set of transition importance values rather than a different transition importance dataset that includes the second set of transition importance values. Thus, identifying transition importance values in the example above would involve selecting a particular transition importance dataset that is specific to a particular user group or journey type.

Figure 6:
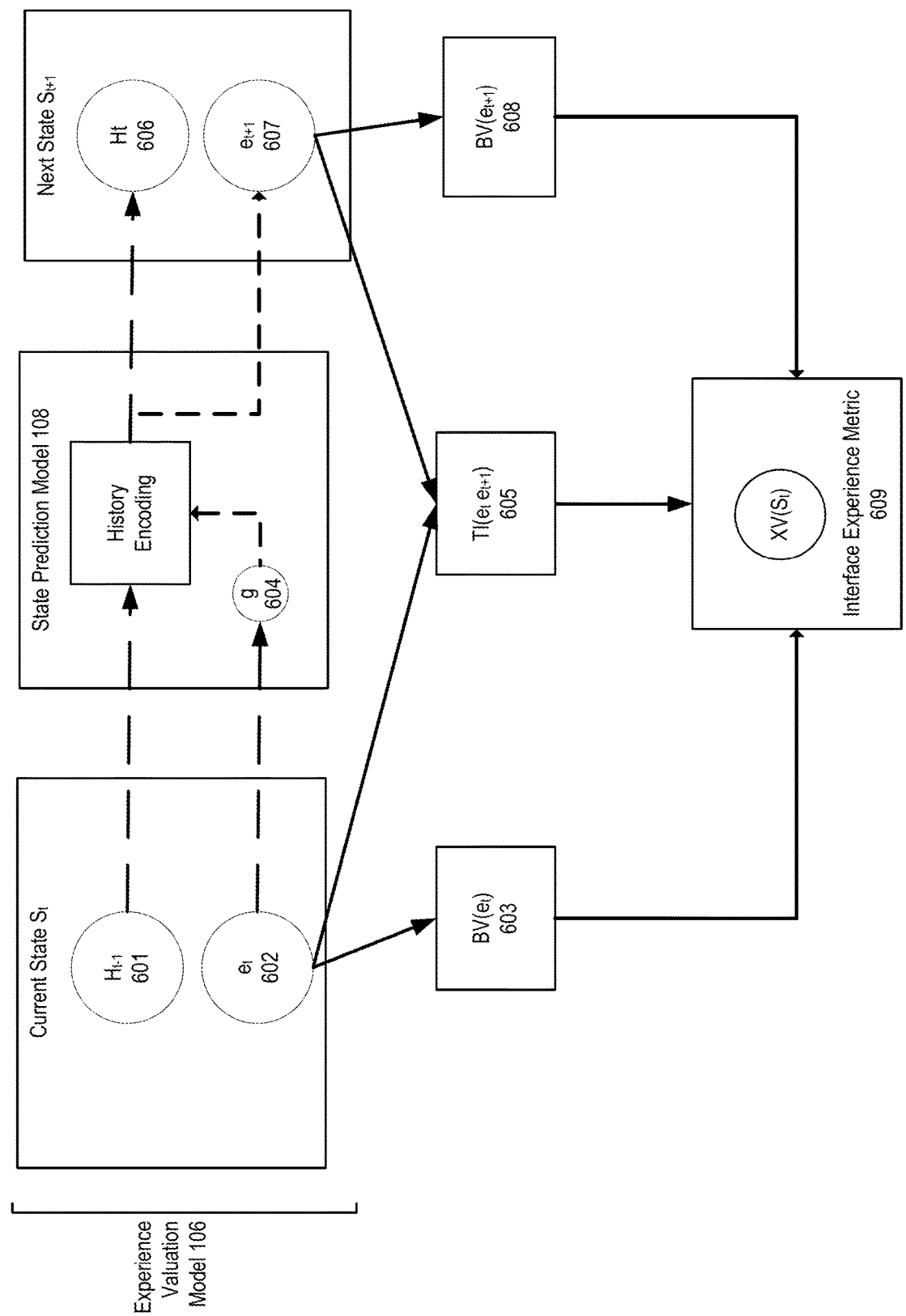
FIG. 6 depicts an example of computing an interface experience metric using a combination of base values and transition importance values, according to certain embodiments of the present disclosure.

FIG. 6 depicts an example of computing the interface experience metric using a transition importance in combination with base values of a current click state and predicted next states. In this example, the current click state is represented by $e_t$ 602, the historical encoding function is represented by g 604 and the predicted next state is represented by $e_{t+1}$ 607. In some embodiments, the encoding function g 604 is characterized by $g:S \rightarrow \mathbb{R}^d$, such that $H_0 = \vec{0}$ and $\vec{H}_t = g(\vec{H}_{t-1}, E_t)$. In this example, $\mathbb{R}^d$ represents a set of real numbers with d dimensions.

The historical function $H_{t-1}$ includes previous state information (e.g., all prior interaction information for a journey) and incorporates $e_t$ into $H_t$ for predicting future states. As described above with respect to FIG. 4, these values are used to generate or identify current click state base value 603 and predicted next state base value 608. The transition importance 605 is determined based on a combination of the current click state and the predicted next click state. In some embodiments, the interface experience metric 609 is computed from current state base value 603, transition importance 605, and predicted next state base value 608 according to the computation discussed in relation to FIG. 4.

In additional or alternative embodiments, experience metric computation model 104 may normalize an interface experience metric for time duration in a specific click state. For instance, a time deviation in a click state may indicate a change in interface experience prior to receiving a next click state. Thus, applying a normalization term to the summation in Equation (3) can provide a more accurate interface experience metric.

In one example, the normalization term is a state duration weight $T_z(S_t)$ that is computed from the differential of a time in current state $T(S_t)$ and the mean time spent in the current state divided by the standard deviation of time spent in the current state. An example of a formulation for $T_z(S_t)$ is provided below in Equation (4):

$$T_z(S_t) = \frac{T(S_t) - \text{mean}(T(e_i))}{std(T(e_i))}. \qquad (4)$$

In Equation (4), $\text{mean}(T(e_i))$ is the mean of a set of durations that user devices remained in a click state $e_i$ and $std(T(e_i))$ is the standard deviation of this set of durations. A computing system (e.g., the environment evaluation system 102 or the training system 120) calculates the mean and standard deviation from a cluster of interaction data 116. An example in which the experience metric computation model 104 incorporates the term $T_z(S_t)$ into a computation of an interface experience metric is:

$$XV(S_t) = \omega_0 B(e_i) + T_z(S_t) \sum_{j=1}^{|\varepsilon|} TI(e_i, e_j) \Delta B_{ij}. \qquad (5)$$

Thus, as indicated in Equation (5) a state duration weight is applied to the summation term and, by extension, to each transition value differential $\Delta B_{ij}$.

In this formulation, $W = \{\omega_0, \omega_1, \ldots, \omega_{|\varepsilon|}\}$ is a set of unknown parameters for tuning the interface experience metric, and is discussed elsewhere herein. In various embodiments, the experience metric computation model 104 may use any of Equations 2-4 to compute the interface experience metric. But other implementations involving other combinations of terms are possible.

Example of Training an Experience Metric Computation Model

One or more models within the experience metric computation model 104 can be trained in any suitable manner. For instance, the training engine 122 trains the state prediction model 108 using accesses training interaction data 124 that includes training click states and associated training journeys. The training engine 122 may use known current states and ground truth next states from the training interaction data 124 to tune the state prediction model 108. Tune the state prediction model 108 includes, for example, modifying numbers of layers in the state prediction model 108, modifying connections between layers, modifying number of nodes within layers, modifying weights applied to nodes, or some combination thereof.

The training engine 122 tunes the state prediction model 108 such that, for example, predicted probabilities of next states match statistical distributions of next states. In a simplified example, training interaction data 124 could include certain journeys that include state A. 40% of these journeys in the training interaction data 124 could include state B as a next state, 50% of these journeys in the training interaction data 124 could include state C as a next state, and 10% of these journeys in the training interaction data 124 could include state D as a next state. The training engine 122 iteratively applies the state prediction model 108 and tunes the state prediction model 108 such that the state prediction model 108, when applied to these journeys, outputs a transition probability at or near 40% for transitioning from state A to state B, a transition probability at or near 50% for transitioning from state A to state C, and a transition probability at or near 10% for transitioning from state A to state D.

Additionally or alternatively, the training engine 122 is training the experience valuation model 106. Training the experience valuation model 106 involves finding desirable values of tuning parameters $\omega_j$ from Equation 1 and $\omega_0$ from Equations 2, 3, and 5. In this example, the training engine 122 accesses training interaction data 124 that includes training click states and associated training journeys. The training engine 122 modifies one or more of these tuning parameters to minimize violations of a constraint function when computing a set of training interface experience metrics from the training interaction data 124.

In some embodiments, the constraint function could include computing an interface experience metric that minimizes rule violations. In one example, a state at a time step t could be represented by $S_t=(\vec{H}_{t-1}, e_i)$ having interface experience metric $XV(S_t)$. The constraint function used by the training engine 122 could be that if $XV(S_t) \geq B(e_i)$ then $S_{t+1}=(\vec{H}_t, e_j)$ such that $B(e_j) \geq B(e_i)$ and that if $XV(S_t) < B(e_i)$ then $S_{t+1}=(\vec{H}_t, e_j)$ such that $B(e_j) < B(e_i)$. For instance, this constraint function specifies that a first relationship between (i) a training interface experience metric computed for a training click state and (ii) a base value for the training click state should correspond to a second relationship between (i) the base value for the training click state and (ii) an additional base value for a subsequent training click state. This constraint indicates that an end user who is having a better experience than that indicated by the base value of the current click state will transition to a state with higher value than of the current click state, and vice-versa.

In some embodiments, a weighting term $\omega_0$ can be computed using linear regression and a loss function as formulated:

$$\hat{y}_t = \sigma(XV(S_t) - B(e_i)) \text{ and } \hat{y}_t = \sigma(B(e_j) - B(e_j)), \text{ and}$$

$$L_W = \sum_{k=1}^{K} \sum_{t=1}^{T} \|\hat{y}_t - y_t\|_2^2$$

In this example, σ is a Sigmoid function with a high slope to simulate a unit step function. This is an implementation of a number of rule-violations in a differentiable form.

In some embodiments, both the training and application of the experience metric computation model 104 are performed in a segmented basis. A segment could include a set of entities (e.g., user devices 118, users of the devices, etc.) that exhibit similar behavior, such as journeys that do not vary significantly from one another, associated users or other entities having similar characteristics (demographics, psychographic profiles, etc.). In a training process, training interaction data is segmented into different training datasets by, for example, computing representation vectors for different entities or training journeys (i.e., subsets of the training interaction data for similar users or journeys) and clustering these representation vectors in a vector space. A particular training dataset, which corresponds to the representation vectors in a particular cluster, is selected and used as the training interaction data for one or more of the training processes above. A training dataset corresponds to the representation vectors because, for example, the training dataset includes a subset of interaction data generated by entities included in the cluster or includes interaction data within the cluster.

In one example, the training engine 122 could modify one or more tuning parameters based on a particular training dataset and thereby compute a particular set of one or more tuning parameter values for a particular segment. The tuning parameters are provided to the environment evaluation system 102. If the environment evaluation system 102 encounters a journey that should be assigned to that particular segment (e.g., because a representation vector computed from the journey is in or near the cluster for the particular segment), the environment evaluation system 102 applies the experience metric computation model 104 using the particular set of one or more tuning parameter values for that segment.

The examples provided above refer to a "training" engine and "training" data. In various embodiments, a training process could include, be supplemented with, or replaced by a testing process. A testing process can be used to evaluate and, in some cases, modify one or more aspects of the experience metric computation model 104 The testing process could be implemented using similar data and algorithms described above with respect to the training examples.

Example of a Computing System for Implementing Certain Embodiments

Figure 7:
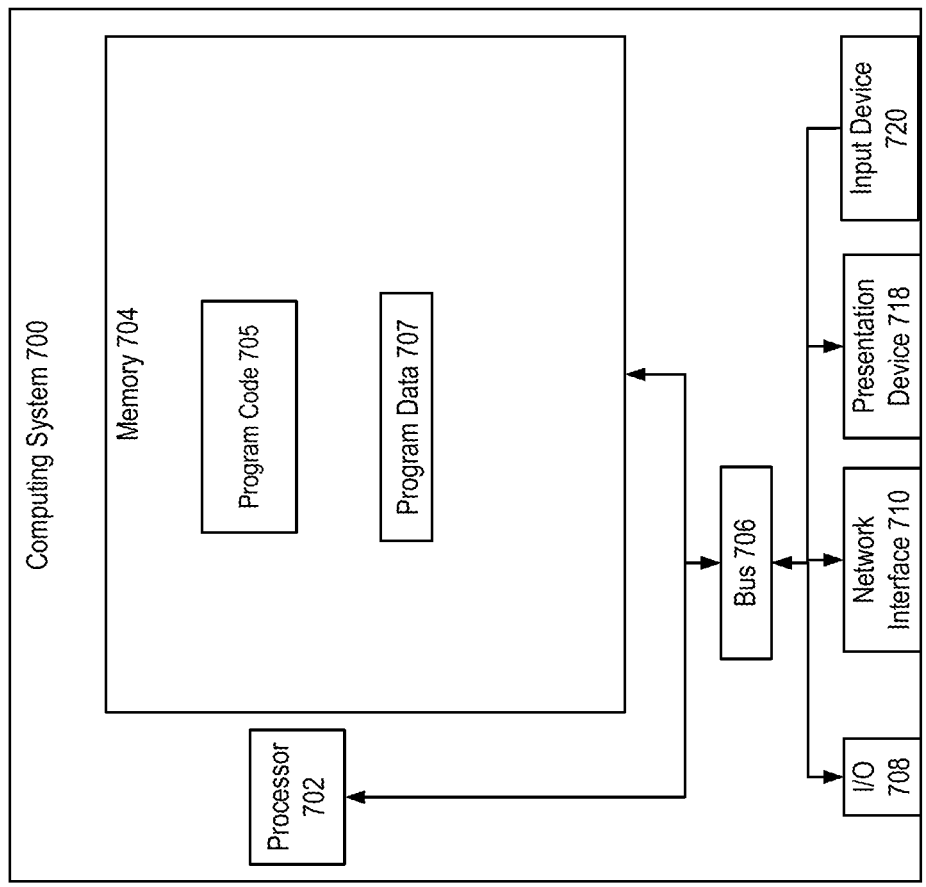
FIG. 7 depicts an example of a computing system for implementing certain embodiments of the present disclosure.

Any suitable computing system or group of computing systems can be used for performing the operations described herein. For example, FIG. 7 depicts an example of the computing system 700. The implementation of computing system 700 could be used for one or more of an environment evaluation system 102, a host system 112, and a training system 1120. In other embodiments, a single computing system 700 having devices similar to those depicted in FIG. 7 (e.g., a processor, a memory, etc.) combines the one or more operations and data stores depicted as separate systems in FIG. 1.

The depicted example of a computing system 700 includes a processor 702 communicatively coupled to one or more memory devices 704. The processor 702 executes computer-executable program code stored in a memory device 704, accesses information stored in the memory device 704, or both. Examples of the processor 702 include a microprocessor, an application-specific integrated circuit ("ASIC"), a field-programmable gate array ("FPGA"), or any other suitable processing device. The processor 702 can include any number of processing devices, including a single processing device.

A memory device 704 includes any suitable non-transitory computer-readable medium for storing program code 715, program data 716, or both. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript.

The computing system 700 may also include a number of external or internal devices, an input device 720, a presentation device 718, or other input or output devices. For example, the computing environment 100 is shown with one or more input/output ("I/O") interfaces 708. An I/O interface 708 can receive input from input devices or provide output to output devices. One or more buses 706 are also included in the computing system 700. The bus 706 communicatively couples one or more components of a respective one of the computing system 700.

The computing system 700 executes program code 705 that configures the processor 702 to perform one or more of the operations described herein. Examples of the program code 705 include, in various embodiments, modeling algorithms executed by the environment evaluation system 102 (e.g., functions of the experience metric computation model 104), the training engine 122, the online platform 114, or other suitable applications that perform one or more operations described herein (e.g., one or more development applications for configuring the online platform 114). The program code may be resident in the memory device 704 or any suitable computer-readable medium and may be executed by the processor 702 or any other suitable processor.

In some embodiments, one or more memory devices 704 stores program data 707 that includes one or more datasets and models described herein. Examples of these datasets include interaction data, experience metrics, training interaction data or historical interaction data, transition importance data, etc. In some embodiments, one or more of data sets, models, and functions are stored in the same memory device (e.g., one of the memory devices 704). In additional or alternative embodiments, one or more of the programs, data sets, models, and functions described herein are stored in different memory devices 704 accessible via a data network.

In some embodiments, the computing system 700 also includes a network interface device 710. The network interface device 710 includes any device or group of devices suitable for establishing a wired or wireless data connection to one or more data networks. Non-limiting examples of the network interface device 710 include an Ethernet network adapter, a modem, and/or the like. The computing system 700 is able to communicate with one or more other computing devices (e.g., a computing device executing an environment evaluation system 102) via a data network using the network interface device 710.

In some embodiments, the computing system 700 also includes the input device 720 and the presentation device 718 depicted in FIG. 7. An input device 720 can include any device or group of devices suitable for receiving visual, auditory, or other suitable input that controls or affects the operations of the processor 702. Non-limiting examples of the input device 720 include a touchscreen, a mouse, a keyboard, a microphone, a separate mobile computing device, etc. A presentation device 718 can include any device or group of devices suitable for providing visual, auditory, or other suitable sensory output. Non-limiting examples of the presentation device 718 include a touchscreen, a monitor, a speaker, a separate mobile computing device, etc.

Although FIG. 7 depicts the input device 720 and the presentation device 718 as being local to the computing device that executes the environment evaluation system 102, other implementations are possible. For instance, in some embodiments, one or more of the input device 720 and the presentation device 718 can include a remote client-computing device that communicates with the computing system 700 via the network interface device 710 using one or more data networks described herein.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alternatives to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

The invention claimed is:

1. A method comprising:
   operating an environment evaluation system for working with a host system that modifies an interactive computing environment by, at least:
   (a) hosting an online platform, and
   (b) performing a modification of an arrangement of interface elements of the online platform based on an interface experience metric computed from interaction data; and
   performing, with one or more processing devices of the environment evaluation system, operations comprising:
   (c) applying a state prediction model to the interaction data from the online platform and thereby computing probabilities of transitioning from a click state to different next states;
   (d) identifying a current base value for the click state and subsequent base values for the different next states;
   (e) computing value differentials between the current base value and the subsequent base values, wherein each value differential indicates a changed quality of interface experience between the click state and a next state; and
   (f) computing the interface experience metric from a sum of the current base value and the value differentials weighted with the probabilities computed by the state prediction model; and
   (g) updating the host system with the interface experience metric, wherein the interface experience metric is usable by the host system for performing the modification of the arrangement of the interface elements to improve the interface experience metric.

2. The method of claim 1, wherein the computed probabilities include (i) a first probability of transitioning from the click state represented by the interaction data to a first predicted next state and (ii) a second probability of transitioning from the click state to a second predicted next state, wherein the value differentials include (i) a first value differential computed from a difference between the current base value and a first subsequent base value for the first predicted next state and (ii) a second value differential computed from a difference between the current base value and a second subsequent base value for second predicted next state, wherein the first value differential indicates a higher quality of interface experience than the second value differential, wherein the operations further comprise:
   identifying (i) a first transition importance for transitioning from the click state to the first predicted next state and (ii) a second transition importance for transitioning from the click state to the second predicted next state, wherein identifying a transition importance comprises determining, from historical interaction data, a statistical likelihood of a transition leading to a target outcome;
   weighting the first value differential with the first transition importance in addition to the first probability; and
   weighting the second value differential with the second transition importance in addition to the second probability,
   wherein the interface experience metric is computed with (i) the first value differential weighted with the first transition importance in addition to the first probability and (ii) the second value differential weighted with the second transition importance in addition to the second probability.

3. The method of claim 2, wherein identifying each of the first transition importance and the second transition importance comprises:
   computing a representation vector from the interaction data or entity data;
   accessing a vector space having (i) a first cluster generated from the historical interaction data or the entity data and (ii) a second cluster generated from additional historical interaction data or the entity data; and
   selecting, based on the representation vector defining a point that is closer to the first cluster than the second cluster, the first transition importance and the second transition importance from a transition importance dataset corresponding to the historical interaction data.

4. The method of claim 2, the operations further comprising:
   computing a state duration weight based on a statistical deviation of a duration for the click state from historical durations for the click state; and
   applying the state duration weight to both the first value differential and the second value differential,
   wherein the interface experience metric is computed with (i) the first value differential weighted with the state duration weight in addition to the first probability and the first transition importance and (ii) the second value differential weighted with the state duration weight in addition to the second probability and the second transition importance.

5. The method of claim 1, the operations further comprising training an experience valuation model, which computes the interface experience metric, by performing training operations comprising:
   accessing training interaction data having training click states; and
   modifying one or more tuning parameters applied to a sum of (i) one or more current base values and (ii) value differentials weighted with probabilities from the state prediction model, wherein the one or more tuning parameters are modified to minimize violations of a constraint function,
   wherein the constraint function specifies that a first relationship between a training interface experience metric computed for a training click state and a base value for the training click state corresponds to a second relationship between the base value for the training click state and an additional base value for a subsequent training click state.

6. The method of claim 5, wherein the one or more tuning parameters are modified to have (i) one or more first one or more tuning parameter values for a first segment and (ii) one or more second one or more tuning parameter values for a second segment, wherein the training operations further comprise:
   segmenting the training interaction data into a first training dataset and a second training dataset, wherein segmenting the training interaction data comprises:

computing representation vectors for entities corresponding to respective subsets of the training interaction data corresponding to respective user devices;

clustering the representation vectors within a vector space;

identifying the first training dataset based on first representation vectors for the first training dataset being included in a first one of the clusters, and identifying the second training dataset based on second representation vectors for the second training dataset being included in a second one of the clusters;

modifying the one or more tuning parameters based on the first training dataset to compute the first one or more tuning parameter values for the first segment; and modifying the one or more tuning parameters based on the second training dataset to compute the second one or more tuning parameter values for the second segment.

7. The method of claim 6, the operations further comprising:

computing a representation vector for an entity associated with the interaction data;

determining, from the representation vector, that the interaction data indicates the entity in the first segment; and applying the experience valuation model using the first one or more tuning parameter values.

8. A system comprising:

a memory device storing interaction data generated by interactions with interface elements of an online platform;

a host system configured for:
hosting the online platform, and
modifying an arrangement of the interface elements based on an interface experience metric computed from the interaction data; and an environment evaluation system comprising:
one or more processing devices configured for performing operations comprising:
applying a state prediction model to the interaction data from the online platform and thereby computing probabilities of transitioning from a click state to different next states;
identifying a current base value for the click state and subsequent base values for the different next states,
applying an experience valuation model that computes value differentials between the current base value and the subsequent base values, wherein each value differential indicates a changed quality of interface experience between the click state and a next state, and
computing, with the experience valuation model, the interface experience metric from a sum of the current base value and the value differentials weighted with the probabilities computed by the state prediction model; and
a network interface device configured for transmitting the interface experience metric to the online platform.

9. The system of claim 8, wherein the computed probabilities include (i) a first probability of transitioning from the click state represented by the interaction data to a first predicted next state and (ii) a second probability of transitioning from the click state to a second predicted next state, wherein the value differentials include (i) a first value differential computed from a difference between the current base value and a first subsequent base value for first predicted next state and (ii) a second value differential computed from a difference between the current base value and a second subsequent base value for second predicted next state, wherein the operations further comprise:

identifying (i) a first transition importance for transitioning from the click state to the first predicted next state and (ii) a second transition importance for transitioning from the click state to the second predicted next state, wherein identifying a transition importance comprises determining, from historical interaction data, a statistical likelihood of a transition leading to a target outcome;

weighting the first value differential with the first transition importance in addition to the first probability; and weighting the second value differential with the second transition importance in addition to the second probability, wherein the interface experience metric is computed with (i) the first value differential weighted with the first transition importance in addition to the first probability and (ii) the second value differential weighted with the second transition importance in addition to the second probability.

10. The system of claim 9, wherein identifying each of the first transition importance and the second transition importance comprises:

computing a representation vector from the interaction data or entity data;

accessing a vector space having (i) a first cluster generated from the historical interaction data or the entity data and (ii) a second cluster generated from additional historical interaction data or the entity data; and selecting, based on the representation vector defining a point that is closer to the first cluster than the second cluster, the first transition importance and the second transition importance from a transition importance dataset corresponding to the historical interaction data.

11. The system of claim 9, the operations further comprising:

computing a state duration weight based on a statistical deviation of a duration for the click state from historical durations for the click state; and applying the state duration weight to both the first value differential and the second value differential, wherein the interface experience metric is computed with (i) the first value differential weighted with the state duration weight in addition to the first probability and the first transition importance and (ii) the second value differential weighted with the state duration weight in addition to the second probability and the second transition importance.

12. The system of claim 8, the operations further comprising training the experience valuation model by performing training operations comprising:

accessing training interaction data having training click states; and modifying one or more tuning parameters applied to a sum of (i) one or more current base values and (ii) value differentials weighted with probabilities from the state prediction model, wherein the one or more tuning parameters are modified to minimize violations of a constraint function, wherein the constraint function specifies that a first relationship between a training interface experience metric computed for a training click state and a base value for the training click state corresponds to a second relationship between the base value for the training click state and an additional base value for a subsequent training click state.

13. The system of claim 12, wherein the one or more tuning parameters are modified to have (i) one or more first one or more tuning parameter values for a first segment and (ii) one or more second one or more tuning parameter values for a second segment, wherein the training operations further comprise:
  segmenting the training interaction data into a first training dataset and a second training dataset, wherein segmenting the training interaction data comprises:
    computing representation vectors for entities corresponding to respective subsets of the training interaction data corresponding to respective user devices;
    clustering the representation vectors within a vector space;
    identifying the first training dataset based on first representation vectors for the first training dataset being included in a first one of the clusters, and
    identifying the second training dataset based on second representation vectors for the second training dataset being included in a second one of the clusters;
  modifying the one or more tuning parameters based on the first training dataset to compute the first one or more tuning parameter values for the first segment; and
  modifying the one or more tuning parameters based on the second training dataset to compute the second one or more tuning parameter values for the second segment.

14. The system of claim 13, the operations further comprising:
  computing a representation vector for an entity associated with the interaction data;
  determining, from the representation vector, that the interaction data indicates an entity in the first segment; and
  applying the experience valuation model using the first one or more tuning parameter values.

15. A non-transitory computer-readable medium having program code that is stored thereon, the program code executable by one or more processing devices to cause the one or more processing devices to:
  operate an environment evaluation system for working with a host system that modifies an interactive computing environment by, at least:
    (a) hosting an online platform, and
    (b) performing a modification of an arrangement of interface elements of the online platform based on an interface experience metric computed from interaction data; and
  perform, with the environment evaluation system, operations comprising:
    (c) applying a state prediction model to the interaction data from the online platform and thereby computing probabilities of transitioning from a click state to different next states;
    (d) identifying a current base value for the click state and subsequent base values for the different next states;
    (e) computing value differentials between the current base value and the subsequent base values, wherein each value differential indicates a changed quality of interface experience between the click state and a next state; and
    (f) computing the interface experience metric from a sum of the current base value and the value differentials weighted with the probabilities computed by the state prediction model; and
    (g) updating the host system with the interface experience metric, wherein the interface experience metric is usable by the host system for performing the modification of the for performing the modification of the arrangement of the interface elements to improve the interface experience metric.

16. The non-transitory computer-readable medium of claim 15, wherein the computed probabilities include (i) a first probability of transitioning from the click state represented by the interaction data to a first predicted next state and (ii) a second probability of transitioning from the click state to a second predicted next state, wherein the value differentials include (i) a first value differential computed from a difference between the current base value and a first subsequent base value for first predicted next state and (ii) a second value differential computed from a difference between the current base value and a second subsequent base value for second predicted next state, wherein the operations further comprise:
  identifying (i) a first transition importance for transitioning from the click state to the first predicted next state and (ii) a second transition importance for transitioning from the click state to the second predicted next state, wherein identifying a transition importance comprises determining, from historical interaction data, a statistical likelihood of a transition leading to a target outcome;
  weighting the first value differential with the first transition importance in addition to the first probability; and
  weighting the second value differential with the second transition importance in addition to the second probability,
  wherein the interface experience metric is computed with (i) the first value differential weighted with the first transition importance in addition to the first probability and (ii) the second value differential weighted with the second transition importance in addition to the second probability.

17. The non-transitory computer-readable medium of claim 16, wherein identifying each of the first transition importance and the second transition importance comprises:
  computing a representation vector from the interaction data or entity data;
  accessing a vector space having (i) a first cluster generated from the historical interaction data or the entity data and (ii) a second cluster generated from additional historical interaction data or the entity data; and
  selecting, based on the representation vector defining a point that is closer to the first cluster than the second cluster, the first transition importance and the second transition importance from a transition importance dataset corresponding to the historical interaction data.

18. The non-transitory computer-readable medium of claim 16, the operations further comprising:
  computing a state duration weight based on a statistical deviation of a duration for the click state from historical durations for the click state; and
  applying the state duration weight to both the first value differential and the second value differential,
  wherein the interface experience metric is computed with (i) the first value differential weighted with the state duration weight in addition to the first probability and the first transition importance and (ii) the second value differential weighted with the state duration weight in addition to the second probability and the second transition importance.

19. The non-transitory computer-readable medium of claim 15, the operations further comprising training an experience valuation model, which computes the interface experience metric, by performing training operations comprising:

accessing training interaction data having training click states; and modifying one or more tuning parameters applied to a sum of (i) one or more current base values and (ii) value differentials weighted with probabilities from the state prediction model, wherein the one or more tuning parameters are modified to minimize violations of a constraint function, wherein the constraint function specifies that a first relationship between a training interface experience metric computed for a training click state and a base value for the training click state corresponds to a second relationship between the base value for the training click state and an additional base value for a subsequent training click state.

20. The non-transitory computer-readable medium of claim 19, wherein the one or more tuning parameters are modified to have (i) one or more first one or more tuning parameter values for a first segment and (ii) one or more second one or more tuning parameter values for a second segment, wherein the training operations further comprise:

segmenting the training interaction data into a first training dataset and a second training dataset, wherein segmenting the training interaction data comprises:

computing representation vectors for entities corresponding to respective subsets of the training interaction data corresponding to respective user devices;

clustering the representation vectors within a vector space;

identifying the first training dataset based on first representation vectors for the first training dataset being included in a first one of the clusters, and identifying the second training dataset based on second representation vectors for the second training dataset being included in a second one of the clusters;

modifying the one or more tuning parameters based on the first training dataset to compute the first one or more tuning parameter values for the first segment;

modifying the one or more tuning parameters based on the second training dataset to compute the second one or more tuning parameter values for the second segment;

computing a representation vector for an entity associated with the interaction data;

determining, from the representation vector, that the interaction data indicates the entity in the first segment; and applying the experience valuation model using the first one or more tuning parameter values.

* * * * *